United States Patent [19]

Boriani et al.

[11] Patent Number: 5,085,028
[45] Date of Patent: Feb. 4, 1992

[54] MACHINE FOR WRAPPING SUBSTANTIALLY PARALLELEPIPED COMMODITIES

[75] Inventors: Silvano Boriani; Antonio Gamberini, both of Bologna, Italy

[73] Assignee: G. D. Societa Per Azioni, Bologna, Italy

[21] Appl. No.: 594,566

[22] Filed: Oct. 9, 1990

[30] Foreign Application Priority Data

Oct. 11, 1989 [IT] Italy ........................................ 3649 A

[51] Int. Cl.⁵ .............................................. B65B 51/14
[52] U.S. Cl. ...................................... 53/234; 53/375.9
[58] Field of Search .............. 53/225, 234, 373, 374.2, 53/375.9

[56] References Cited

U.S. PATENT DOCUMENTS

| | | | |
|---|---|---|---|
| 4,202,151 | 5/1980 | Focke | 53/234 X |
| 4,617,780 | 10/1986 | Focke | 53/234 |
| 4,648,236 | 3/1987 | Knecht | 53/234 |
| 4,969,020 | 3/1990 | Focke | 53/234 X |

FOREIGN PATENT DOCUMENTS 1530750 11/1978 United Kingdom .

*Primary Examiner*—John Sipos
*Attorney, Agent, or Firm*—Cushman, Darby & Cushman

[57] ABSTRACT

The machine is designed to enfold substantially parallelepiped packs in transparent wrappers, and comprises an indexing wheel provided with radial pockets each designed to accommodate one pack together with its wrapper, which is folded to the point where the pack becomes completely enveloped save for an area of each end face perpendicular to the axis of the wheel. The pockets are enclosed laterally by corresponding pairs of tongues lying normal to the axis of rotation, and indexed through a station to which one longitudinal flank of the part-enveloped pack is engaged by a heat-seal device; the ends of the tongues farthest from the wheel axis carry reaction pads that operate in conjunction with the heated plate of the device, of which the length is substantially equal to the full width of the wrapper, both measured parallel with the axis of rotation of the wheel.

2 Claims, 2 Drawing Sheets

MACHINE FOR WRAPPING SUBSTANTIALLY PARALLELEPIPED COMMODITIES

BACKGROUND OF THE INVENTION

The invention relates to a machine for wrapping commodities of substantially parallelepiped shape, and in particular, a machine serving to envelop such parallelepiped items in an outer wrapping of transparent material.

The prior art embraces machines for placing an outer wrapping around parallelepiped commodities, especially packs of cigarettes (the case to which the following specification refers); such machines comprise a head, or wheel, rotatable intermittently about a horizontal axis and affording peripheral radial pockets spaced apart one from the next at identical angular distances, each of which designed to accommodate one pack of cigarettes.

The single pocket comprises a bottom wall, nearest the center of the wheel, two substantially radial walls set apart one from the other at a distance essentially matching that of the thickness of one pack, and two end walls embodied generally as two blades or tongues occupying planes normal to the axis of the wheel, located one on either side and separated by a distance corresponding substantially to the longitudinal dimension of the finished paok.

During each pause produced by intermittent rotation of the wheel, one of the pockets comes to rest at an entry station, in alignment with a reciprocating push rod; stroking forward, the rod engages one pack of cigarettes from the rear flank (considered in relation to the path of entry) and directs it into the waiting pocket together with the wrapper, which consists in a single sheet of material fed through a vertical plane transversely to the path of the entering pack.

On completion of the push rod stroke, the pack will be fully inserted in the pocket with its leading flank flush against the bottom wall.

During the course of this operation, the wrapper is folded gradually into a U shape around the pack, enveloping it on three sides.

The transverse dimension of the wrapper, as seen in relation to the direction of entry, is such that its two sides project a given distance beyond the longitudinal dimension of the pack.

On insertion of the pack into the pocket, these projections will be engaged by the leading edges of the blades aforementioned, and folded in part to envelop a proportion of the two faces of the pack normal to the wheel, i.e. the end faces.

Likewise, the longitudinal dimension of the wrapper is such that, when folded into the U formation, the relative ends project beyond the peripheral limit established by the two radial walls of the pocket.

These two projecting ends, or flaps, are folded subsequently, the one by a moving element traversed across the entry point, and the other by a fixed element forming part of a cowling coaxial with the wheel, which engages the corresponding part of the wrapper as the wheel is set in rotation.

With the two radial flaps folded and overlapping, and the wrapper enveloping the pack essentially in tubular fashion, the flank of the pack positioned outermost is offered to a heat-seal device located at a further station subsequently to be occupied by the indexing pocket, and the overlapping flaps are fused together.

With the pack enveloped thus far by the transparent wrapper and entirely encompassed by the wheel and cowling with the exception of the two small end faces, the pocket is indexed ultimately to an exit station diametrically opposed to the entry station, where a further reciprocating push rod proceeds to eject the pack from the wheel, directing it forward into a runout channel along which the operations of folding and sealing the ends of the wrapper will be brought to completion.

Given that the first sealing device in conventional machines serves only to fix the overlapping parts of the two longitudinal flaps that are effectively breasted with the corresponding flank of the pack, it follows that the sealing device installed along the runout channel must, at a single stroke, secure not only the two sets of end flaps gathered up and flattened in the subsequent folding operations, but also the remaining and as yet unsealed end parts of the longitudinal flaps.

In a typical parallelepiped pack as turned out by the conventional machine described above, each end fold comprises six overlapping layers; accordingly, the duty performed by the second sealing device in securing these folds is somewhat heavy, especially where the transparent wrapping material utilized happens to be relatively thick, and in practice the outer wrappings of cigarette packets are often less than perfectly sealed.

The object of the present invention is to embody a wrapping machine capable of overcoming the drawback discerned in the prior art and outlined above, in short, a machine capable of effecting a faultess seal in the transparent wrappings of substantially parallelepiped commodities.

SUMMARY OF THE INVENTION

The stated object is realized in a machine for wrapping substantially parallelepiped commodities, of the type comprising a rotatable head with radial pockets each enclosed on the sides disposed normal to the axis of rotation of the head by respective tongues, internally of which the commodities are accommodated singly, each together with a sheet of wrapping material located between the commodity and the pocket; also a sealing device that is offered to one flank of the commodity contained in each pocket on arrival at a respective station through which the pockets are indexed in succession.

The essential features of the machine disclosed are that it also comprises reaction means operating in conjunction with the sealing device, positioned at the unattached ends of the tongues, and that the heated plate of the sealing device is substantially equal in length, measured parallel to the axis of rotation of the head, to the width of the sheet of wrapping material, measured in the same direction.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
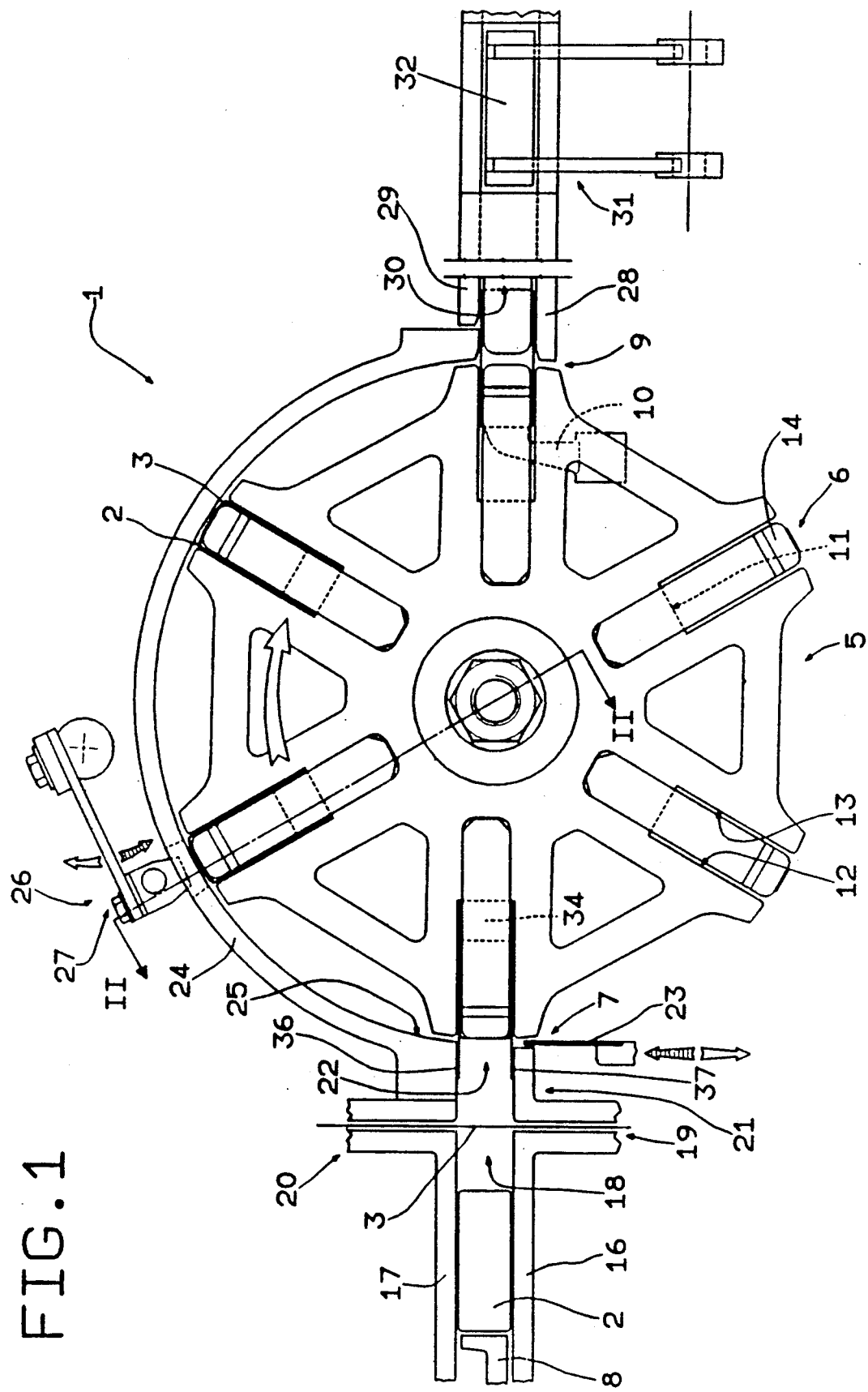
FIG. 1 is the side elevation of a wrapping machine embodied according to the present invention.

With reference to the drawings, 1 denotes a machine for wrapping commodities of parallelepiped shape, in its entirety, and more particularly, a machine designed to envelop packs of cigarettes 2 in sheets of transparent wrapping material 3.

4 denotes a horizontally disposed shaft affording support to a wrapping head or wheel 5 provided with six peripheral pockets 6 which are spaced apart at an angle of 60° one from the next, each designed to accommodate one pack 2 positioned sideways-on to the axis of the shaft.

The wheel 5 is set in motion by way of the shaft 4 using conventional means (not illustrated) such as will index it through 60 steps in the clockwise direction as viewed in FIG. 1.

The wheel 5 is placed on the shaft 2 in such a way that with each step indexed, one pocket 6 is moved into an entry station 7, positioned in alignment with a reciprocating push rod 8, and the pocket 6 diametrically opposite is moved simultaneously into an exit station 9 positioned in alignment with a further reciprocating push rod 10.

Each single pocket 6 is bounded by a bottom wall 11, nearest the center of the wheel 5, and two walls 12 and 13 occupying planes that coincide substantially with planes parallel to respective pocket-bisecting radii of the wheel 5 and are separated from one another in each pocket by a distance substantially equal to the thickness of one pack of cigarettes 2.

Also associated with each pocket 6 are two tongues denoted 14, establishing two further walls disposed normal to the axis of rotation of the wheel 5 and separated by a distance substantially equal to the longitudinal dimension of the pack 2. According to the invention, the unattached end of each tongue 14 carries a reaction element 15 (FIG. 2) consisting in a block of resilient material, the purpose of which will become clear in due course.

16 and 17 denote two horizontally disposed guide plates aligned with the push rod 8 of the entry station and affording a passage 18 to the incoming pack 2 of cigarettes.

19 and 20 denote two vertical guides, positioned at the exit of the passage 18, between which to feed a continuous strip of transparent material that is severed into single wrappers 3 by a conventional cutting device (not illustrated).

21 denotes a fold starter located in the path of the push rod 8 between the vertical guides 19 and 20 and the entry station 7, by which a further passage 22 is afforded to the pack 2.

23 denotes a folder, occupying a position at the entry station 7, which is embodied as a vertically disposed vane and made to reciprocate through a plane substantially tangential to the wheel 4.

24 denotes a cowling, concentric with the wheel 5 and extending from the entry station 7 to the exit station 9, of which the initial edge 25 serves as a fixed folder, as will become clear in due course. 26 denotes a sealing station located immediately following the entry station 7 along the peripheral trajectory of the wheel and positioned to coincide with one pocket 6 during the pause between indexed movements, at which the packs 2 are subjected to the action of a relative sealing device 27 that will shortly be described.

28 and 29 denote two further horizontally disposed guide plates aligned with the exit push rod 10 and positioned externally of the wheel 5, by which a passage 30 is afforded to the packs 2 ejected from the pockets 6.

31 denotes a sealing device occupying a position along the path followed by the ejected packs 2 internally of the relative passage 30, consisting in two units 32 disposed one on either side of the passage (one only of which is visible in FIG. 1), by which the end folds of each pack 2 are sealed in conventional manner.

At each pause of the wheel 5, during operation of the machine, the entry push rod 8 is extended in such a way as to direct a pack 2 of cigarettes and a relative wrapper 3 into the pocket 3 currently positioned at the entry station 7.

Passing through the fold starter 21 and into the pocket 6, the wrapper 3 is folded into a U shape around the pack 2, thereby enveloping the leading flank and the top and bottom faces (considered in relation to the direction of entry).

The transverse dimension of the wrapper 3, viewed in relation to the direction of entry, is such that its sides project a given distance beyond the two longitudinal ends of the pack 2.

The parts of the wrapper which project beyond the ends of the leading flank of the pack 2 are folded by the tongues 14 as the pack enters the pocket 6, and more exactly, by the ends 33 of the tongues first encountered on entry, in such a way that the two end faces 34 of the pack disposed normal to the axis of the wheel 5 are enveloped in part.

The endmost parts of the wrapper extending beyond each end face of the pack 6 thus become pairs of flaps 35 which project from the wheel 4 through respective slits left between the longitudinal edges of each tongue 14 and the pocket wall 12 and 13 on either side.

The longitudinal dimension of the wrapper 3 (i.e. that developable from the U profile) is such that the two endmost parts will project as two radial flaps 38 and 39, respectively top and bottom, from a pocket 6 occupying the entry station 7.

The bottom flap 37 is flattened over the rear flank of the pack 6 by the moving folder 23 with the wheel still stationary; the top flap 36 will be flattened on encountering the edge 25 of the fixed cowling 24 once the pocket 6 is indexed away from the entry station 7 toward the sealing station 26. On arrival at the station 26, the sealing device 27 approaches the exposed flank of the pack 2 and fuses the overlapping flaps 36 and 37 together.

Figure 2:
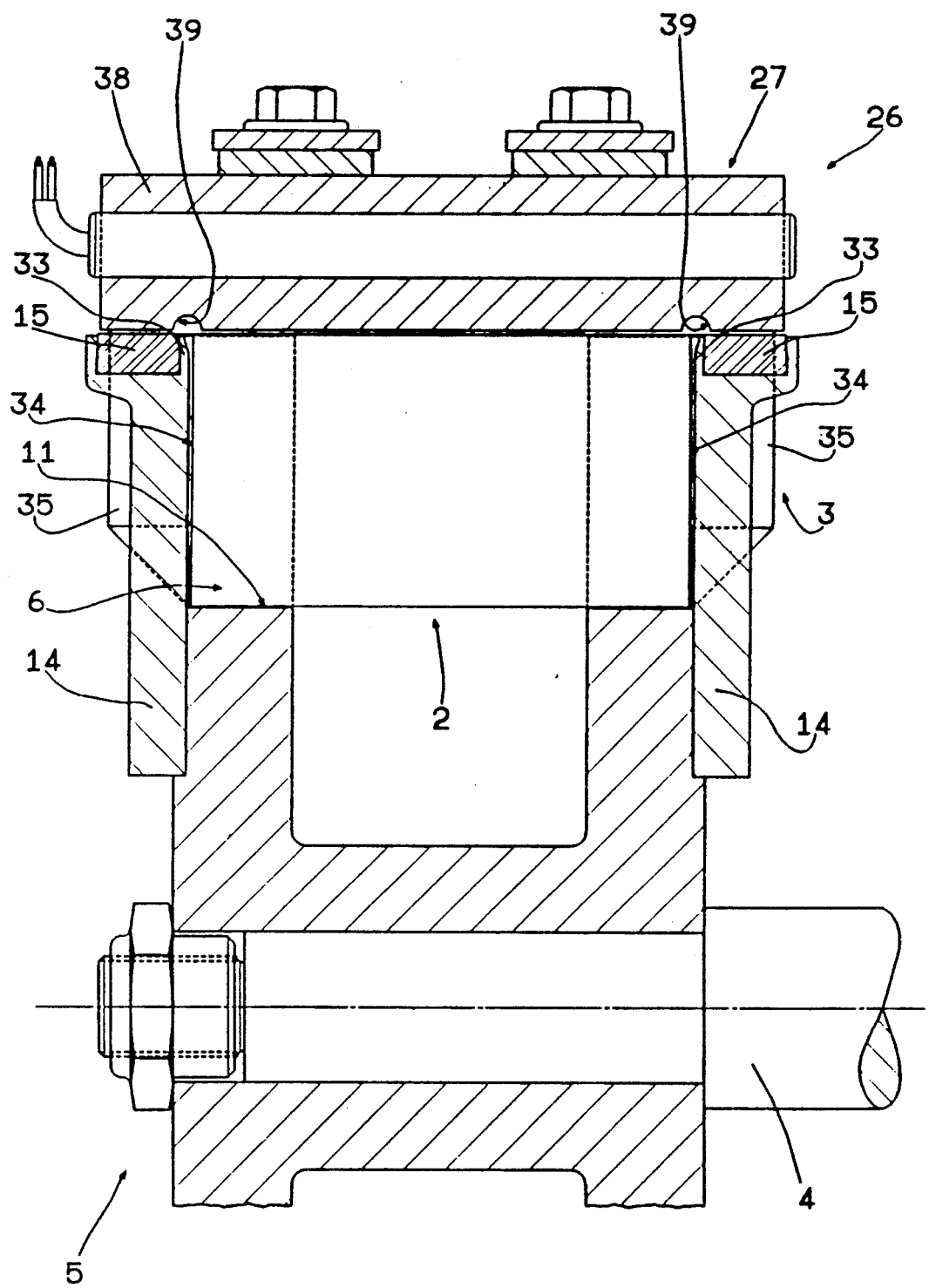
FIG. 2 is a detail of the machine of FIG. 1, seen in section.

As illustrated in FIG. 2, the sealing device 27 comprises a plate 38 heated by conventional means, of which the length, i.e. measured in a direction parallel to the axis of the shaft 4, substantially matches the width of the single wrapper 3, measured in the same direction. As the successively indexing pockets 6 momentarily occupy the station 26, the plate 38 is positioned against the relative pack 2 by conventional actuator means (not illustrated); in a preferred embodiment, the plate itself 38 will be provided with two arched recesses 39 coinciding with two sections which come to rest, during the sealing operation, against the two corners of the pack 2 where the two end faces 34 meet the exposed longitudinal flank.

By virtue of this preferred shape of the plate 38 and the presence of the reaction elements 15 at the unattached ends of the tongues 14, which interact with the plate 38 when the sealing device 27 is brought into operation, the flaps 36 and 37 are made to fuse together along their entire length and therefore require no further action on the part of the second device 31 in order to secure the two end parts. The purpose of the recesses 39 is to prevent any risk of the corners of the pack being damaged by the plate 38 during the sealing operation.

The pocket 6 containing the pack 2, fully enveloped in the sheet of transparent wrapping material 3 with the sole exception of the two end faces 34, is indexed ultimately through two further steps to the exit station 9, and there ejected from the wheel 5 by the push rod 10 into the runout passage 30; it is along this passage, as aforementioned, that the operations of flattening the end folds and sealing them against the end faces 34 are effected by the second sealing device 31.

It will be observed how the wrapping machine 1 thus described is capable of effecting a substantially complete seal along the length of the flaps 36 and 37, thereby eliminating the drawback mentioned in connection with the prior art and realizing the object stated at the outset, i.e. of enabling the second sealing device 31 to secure the end folds of the pack 2 in a faultless manner.

What is claimed is:

1. A machine for providing substantially rectangular parallelpiped articles with wrappers, comprising:
   a head arranged to be rotated about a longitudinal axis; said head being provided with a plurality of equi-angularly spaced radially arranged pockets having respective mouths opening radially outwardly of said head; each pocket being defined by wall means including a radially inner wall arranged to confront one of two opposite side walls of a single substantially rectangular parallelepiped article while such article is being wrapped, two longitudinally spaced, parallel opposite end walls arranged to confront respective opposite end walls of said article; and a pair of angularly spaced, parallel opposite face walls arranged in planes parallel to said axis to confront respective opposite faces of said article; each said pocket having a width, depth and thickness which is sufficient to accommodate receiving a single said article, convolutely wrapped about said one side wall and said two faces by a substantially rectangular sheet of wrapping material that is wider than said article is tall sufficiently to provide two opposite longitudinal edge marginal portion for wrapping against opposite end walls of the package and two opposite end marginal portions that are sufficiently long as to permit them to be folded into a partially overlapping relationship with one another against the other of said side walls of said article; said wall means of said pocket defining four slots disposed where respective end walls and respective face walls adjoin and out through which respective parts of respective longitudinal edge marginal portions of a respective said sheet of wrapping material may protrude;
   means for supplying a succession of respective said sheets of wrapping material, each across a respective said mouth of a respective said pocket at a loading station for said head;
   means for supplying a succession of respective said articles to be wrapped, each radially outwardly of and aligned with a respective said pocket at said loading station, on an opposite side of the respective said sheet of wrapping material from said mouth and for urging a respective said article into the respective said sheet of wrapping material and the resulting combination of article convolutely wrapped about said one side wall and said two faces thereof into the respective said pocket through the respective said mouth so that said respective parts of said respective said longitudinal edge marginal portions protrude out of the respective said pocket through the respective said four slots;
   said head further including, for each pocket, a pair of reaction elements supported on the said end walls of the respective said pocket so as to have respective radially outer surfaces arranged to effectively form generally coplanar extensions, longitudinally of said head, of the other of said side walls of the respective said article received in the respective said pocket;
   means for folding said two opposite end marginal portions of the respective said sheet of wrapping material into a partially overlapping relationship with one another against said other of said side walls of said article and said surfaces of said reaction elements; and
   a sealing means arranged in a sealing station disposed angularly about said axis from said loading station, for sealing together, upon rotation of said wheel to bring a respective pocket from said loading station to said sealing station, said opposite end marginal portions of the respective said sheet, against support provided by said article and said reaction elements where said opposite end marginal portions overlap, throughout a length of seal which is longer than the distance between said opposite end walls of the respective said pocket; and
   a pocket emptying means arranged at an exit station disposed angularly about said axis from said sealing station, for successively emptying each respective pocket of a respective resultingly convolutely wrapped article upon rotation of said wheel to bring a respective pocket from said sealing station to said exit station;
   said sealing means comprising a heated plate arranged to be moved radially towards and away from said head; said heated plate having a sealing surface disposed in confronting relation to said head and having two recesses formed therein and arranged to overly two respective edges of the respective article where respective end walls of said article meet said other of said side walls of said article, for accommodating folds in the respective said piece of wrapping material as said sealing means is operated to heat seal said two opposite end marginal portion of the respective said sheet of wrapping material to one another.

2. The wrapping machine of claim 1, wherein:
   said end walls of said pockets are provided as radially extending tongues having radially inner ends mounted to said head, and free radially outer ends; said reaction elements comprising respective bodies of resilient material mounted on respective ones of said radially outer ends of said tongues.

* * * * *